Dec. 22, 1964     A. J. ROSENBERGER     3,162,047
RATIO INDICATOR
Filed July 19, 1954
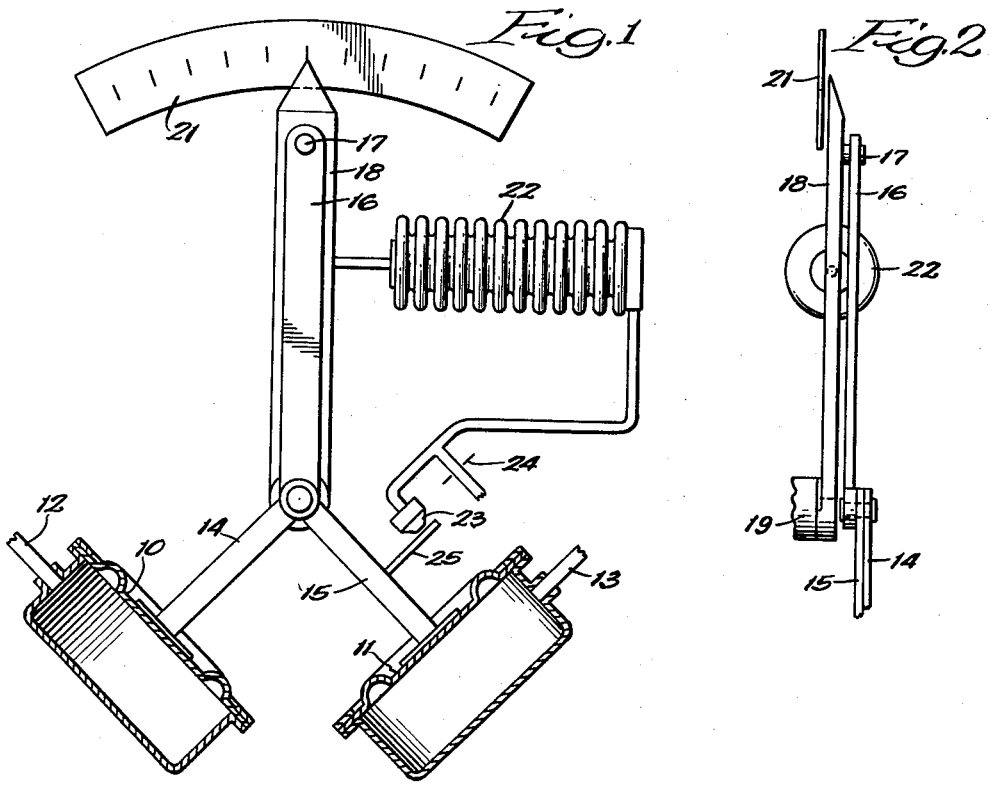
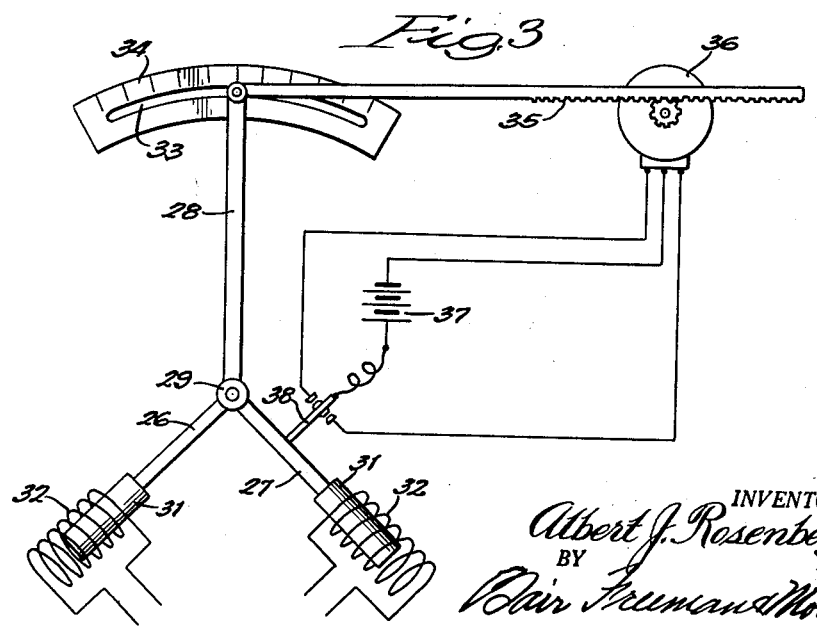
INVENTOR:
Albert J. Rosenberger,
BY
Blair Freeman & Molinare
ATTORNEYS.

United States Patent Office 3,162,047
Patented Dec. 22, 1964

3,162,047
RATIO INDICATOR
Albert J. Rosenberger, Chicago, Ill., assignor, by mesne assignments, to Republic Flow Meters Company, Chicago, Ill., a corporation of Delaware
Filed July 19, 1954, Ser. No. 444,085
1 Claim. (Cl. 73—407)

This invention relates to ratio indicators and more particularly to apparatus for indicating the ratios of two values represented as forces.

There are many industrial applications where it is desirable to know accurately the ratio of two values or conditions. For example, in boiler control it is desirable to know the ratio of steam flow to air flow or to water flow and in other industrial processes it is desirable to know the ratios of other factors such as flows of other components, pressures, temperatures, or the like.

Heretofore, it has been the usual practice to indicate the two values or conditions on a common scale with the indicators adjusted to keep their pointers together when the values are at the desired ratio. With this type of instrument the ratio cannot be accurately determined without calculation due to the fact that the same variation of ratio will produce a different amount of separation of the pointers at different parts of the scale. Thus at the low end of the scale a 10% ratio variation will produce a very small separation of the pointers, say one division, whereas at the high end of the scale a 10% ratio variation will produce a wide separation of the pointers on the order of ten divisions.

It is therefore one of the objects of the present invention to produce a ratio indicator which directly and substantially instantaneously indicates the ratios of two values or conditions.

Another object is to provide a ratio indicator in which the values represented as forces are balanced against each other and any unbalance controls adjusting means which effects a rebalance, the amount of adjustment indicating the variation of the ratio.

According to one feature of the invention, the values are balanced through a linkage including a reaction link whose angle relative to the other link elements is changed to effect rebalance and to indicate ratio variations.

The above and other objects and features of the invention will be more readily apparent from the following description when read in connection with the accompanying drawing, in which:

FIGURE 1 is a diagrammatic elevational view of apparatus embodying the invention;

FIGURE 2 is a partial side elevation of the linkage of FIGURE 1; and

FIGURE 3 is a view similar to FIGURE 1 of an alternative apparatus.

In the apparatus shown in FIGURE 1, the ratio of two values or conditions which are represented by fluid pressures is to be indicated. For this purpose a pair of pressure responsive units, shown as diaphragm units 10 and 11, are provided arranged at an acute angle to each other on the order of ninety degrees, although the exact angle is not critical. Pressures are supplied to the diaphragm units through conduits 12 and 13, respectively. The pressures may be representative of values or conditions whose ratio is to be indicated and may be supplied directly in case pressure ratios are desired or through suitable transmitters which will develop pressures proportional to the values or conditions to be indicated.

The diaphragm units are connected to links 14 and 15, respectively which extend perpendicular to the diaphragms and which consequently lie at the same acute angle to each other as the diaphragms and are pivotally connected at their free ends. A reaction link 16 is pivotally connected at one end to the common pivotal connection of the links 14 and 15, as shown in FIGURES 1 and 2. The reaction link is mounted for angular adjustment relative to the links 14 and 15 to vary the relative effects forces on the links 14 and 15 will have on balance of the linkage. For this purpose, as shown in FIGURES 1 and 2, the opposite end of the reaction link is supported on a pivot 17 carried by a supporting arm 18 which is pivotally mounted at one end on a fixed pivot support 19 which is coaxial with the interconnection between the several links when the linkage is in balance. The end of the supporting arm 18 may function as a pointer movable over a scale 21.

The supporting arm is adapted to be moved automatically in response to unbalance in the linkage in a direction to rebalance the linkage. For this purpose, a fluid responsive element shown as a bellows 22 is provided connected to the supporting arm to move it as the bellows expands or contracts. The bellows is supplied with controlled pressure which is varied by movement of the linkage and which is produced by a bleed nozzle 23 supplied with air through a restriction 24 and connected to the bellows. The nozzle 23 is variably restricted by a vane 25 which may be connected to any one of the links 14, 15 or 16, but which is shown connected to the link 15.

With the parts in balance they will occupy the position shown wherein the link 16 lies at an angle relative to the links 14 and 15 which is proportional to the forces exerted by the bellows units 10 and 11 so that the pivotal interconnection between the links is coaxial with the pivot axis 19. In this position, the nozzle 23 is restricted sufficiently to produce a pressure in the bellows 22 which will hold it expanded to the extent necessary to position the arm 18 correctly. Assuming that when the pressure on the unit 10 increases relative to that on the unit 11, the link 14 will exert a proportionally greater force than the link 15 so that the link 16 will swing counter-clockwise about the pivot 17 and the vane 25 will move away from the nozzle 23. The diaphragms will readily flex the slight amount required for angular movements of the links 14 and 15 even though the links are rigidly secured to the center portions of the diaphragms. This will reduce the pressure acting on the bellows 22 so that it will contract in response to its own resilience or a separate spring and will turn the supporting arm 18 clockwise. As the link 16 becomes more nearly parallel to the link 14 and more nearly at a right angle to the link 15, the force exerted by the link 14 will become less effective relative to that exerted by the link 15 and the linkage will again come to balance. The amount of movement of the supporting arm 18 necessary to achieve balance is a direct indication of the ratio between the forces exerted by the bellows units 10 and 11.

One advantage achieved by this construction is that the normal balance point is at the center of the scale 21, as shown, and any unbalance will produce a relatively large movement of the supporting arm 18 from its center position to effect a rebalance. Toward the ends of the scale relatively smaller movements of the supporting arm are required to rebalance the same ratio variation. However, the instrument normally operates close to the balance point so that any deviations from the desired ratio will produce maximum deflection of the supporting arm and are easily observed.

Instead of operating with fluid pressure responsive units various other types of force producing devices can be equally well employed. FIGURE 3 illustrates an alternative construction wherein the operation is entirely electrical. In this structure three links 26, 27 and 28 are provided which are pivotally interconnected at 29. Each of the links 26 and 27 carries a core 31 of magnetic material which is urged to move into a coil 32 with a force proportional to the current flowing through the coil. In the construction shown, an increase in current tends to draw the core 31 into the coil so that the links 26 and 27 are placed under tension. The link 28 is supported for movement of its upper end in an arcuate path concentric with the axis 29 when the linkage is in balance. As shown, the upper end of the link 28 is slidable in an arcuate slot 33 in a scale 34 and is adapted to be moved along the slot by a rack 35 which is pivoted to the link 28 adjacent its upper end.

Adjustment of the link 28 is effected by a reversible electric motor 36 carrying a pinion which meshes with the rack 35. The motor is supplied with current from a source 37 and supply of energy to its reversing windings is controlled by a double throw switch including a movable contact carried by an arm 38 mounted on the link 27.

In this construction, if the current in the winding 32 associated with link 27 increases, a greater tension will be exerted on the link 27 than on the link 26 and the arm 38 will move downward to close the lower motor circuit. The cores 31 may fit loosely enough in the coils 32 to permit the slight degree of tilting necessary for this movement. This will operate the motor 36 in a direction to shift the rack 35 to the left so that the link 28 becomes more nearly parallel to the link 27 and the force exerted thereon by the link 27 is relatively less effective than the force exerted by the link 26. When the motor has shifted the link 28 far enough to effect a rebalance, the circuit will be interrupted and the linkage will be in its balanced condition. The amount of deflection of the link 28 from its central position will indicate the departure of the ratio from the desired value in the same manner as with the construction of FIGURE 1.

While two embodiments of the invention have been shown and described in detail, it will be understood that they are for the purpose of illustration only and are not to be taken as a definition of the scope of the invention, reference being had for this purpose to the appended claim.

What is claimed is:

A ratio indicator comprising a pair of force producing devices, links lying at an acute angle to each other and respectively connected to the force producing devices to have a force exerted thereon longitudinally of the links by the force producing devices, a reaction link pivoted at one end on a supporting pivot and at its other end pivotally interconnected to the first named links, means mounting the supporting pivot for movement in an arc about the pivotal interconnection, means responsive to movement of the links to produce a regulated force, and means responsive to the value of the regulated force to shift the supporting pivot in a direction to rebalance the forces acting on the first named links, the position of the supporting pivot indicating the ratio of said forces.

References Cited in the file of this patent

UNITED STATES PATENTS

| | | |
|---|---|---|
| 2,257,905 | Gorrie | Oct. 7, 1941 |
| 2,352,312 | Donaldson | June 27, 1944 |
| 2,608,051 | Nettel | Aug. 26, 1952 |
| 2,652,813 | Stresen Reuter et al. | Sept. 22, 1953 |
| 2,736,199 | Ibbott | Feb. 28, 1956 |

FOREIGN PATENTS

| | | |
|---|---|---|
| 698,189 | Germany | Nov. 9, 1930 |
| 681,544 | Germany | Sept. 25, 1939 |
| 899,717 | Germany | Dec. 14, 1953 |